United States Patent
Tian et al.

(10) Patent No.: US 11,880,664 B2
(45) Date of Patent: Jan. 23, 2024

(54) IDENTIFYING AND TRANSFORMING TEXT DIFFICULT TO UNDERSTAND BY USER

(71) Applicant: International Business Machines Corporation, Armonk, NY (US)

(72) Inventors: Peng Fei Tian, Beijing (CN); Ting Ting Zhan, Beijing (CN); Jing Bai, Beijing (CN); Dong Chen, Beijing (CN); Jun Su, Beijing (CN); Zhen Rong Wang, Beijing (CN); Shu Tang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 17/394,240

(22) Filed: Aug. 4, 2021

(65) Prior Publication Data
US 2023/0042683 A1    Feb. 9, 2023

(51) Int. Cl.
*G06F 40/30* (2020.01)
*G06F 40/284* (2020.01)
*G06F 16/33* (2019.01)
*G06F 16/335* (2019.01)
*G06F 16/338* (2019.01)
(Continued)

(52) U.S. Cl.
CPC ............ *G06F 40/30* (2020.01); *G06F 16/337* (2019.01); *G06F 16/338* (2019.01); *G06F 16/3344* (2019.01); *G06F 16/3347* (2019.01); *G06F 18/22* (2023.01); *G06F 40/284* (2020.01); *G06V 10/768* (2022.01)

(58) Field of Classification Search
CPC ...... G06F 40/30; G06F 40/284; G06F 16/337; G06F 16/338
See application file for complete search history.

(56) References Cited

U.S. PATENT DOCUMENTS 7,337,392 B2   2/2008   Lue
9,984,045 B2   5/2018   Bacus et al.
(Continued)

OTHER PUBLICATIONS

Anonymous, "System and Method for Adjusting Contents of a Book Based on Social Lens on Behavioral Patterns," ip.com, ip.com No. IPCOM000228696D, Jun. 30, 2013, pp. 1-2.
(Continued)

*Primary Examiner* — Ibrahim Siddo
(74) *Attorney, Agent, or Firm* — Shackelford, Bowen, McKinley & Norton, LLP; Robert A. Voigt, Jr.

(57) ABSTRACT

A computer-implemented method, system and computer program product for improving understandability of text by a user. A final word vector for each word in a sentence of a document is computed, such as by averaging a first word vector and a second word vector for that word. Furthermore, elements of a user portrait are vectorized. A distance is then computed between a vector for each word in the sentence and a vectorized element in the user's portrait which is summed to form an evaluation result for the element. An evaluation result is also formed for every other element in the user's portrait by performing such a computation step. A "final evaluation result" is then generated corresponding to the evaluation results for every element in the user's portrait. The document is then transformed in response to the final evaluation result indicating a lack of understanding of the sentence by the user.

20 Claims, 8 Drawing Sheets

(51) Int. Cl.
*G06V 10/70* (2022.01)
*G06F 18/22* (2023.01)

(56) References Cited

U.S. PATENT DOCUMENTS

| | | |
|---|---|---|
| 10,885,271 B2 | 1/2021 | Liu |
| 2019/0197114 A1* | 6/2019 | Lee .................. G06F 40/40 |
| 2021/0295826 A1* | 9/2021 | Morabia ............ H04L 51/046 |

OTHER PUBLICATIONS

Anonymous, "A Method for Content Automated Auxiliary Extension," ip.com, ip.com No. IPCOM000260502D, Nov. 30, 2019, pp. 1-2.

* cited by examiner

500

Q. How are recommendations ranked in Oncology and how is it better than the base NCCN guidelines?

501 — The NCCN guidelines consider a very small set of patient attributes when compared to Oncology services.

For example, in breast cancer, when trying to decide between an aggressive chemotherapy, such as AC followed by Taxane, versus a less aggressive chemotherapy, such as CMF, Watson for Oncology considers more patient attributes, more evidence, and the expert guidance of MSK than do the NCCN Guidelines. The following factors are considered: — 502 patient age, performance status, comorbidities, special concerns about toxicities for heart, liver, kidney, etc, multifocality, burden of disease, Prior treatments/surgeries, Margin status, Tumor size and histology.

FIG. 5

501' — The NCCN guidelines consider a very small set of patient attributes when compared to cancer-related medical care 601 — The National Comprehensive Cancer Network (NCCN) is a nonprofit alliance of 27 cancer centers throughout the U.S. Experts from NCCN cancer centers diagnose and treat all cancers, with a particular focus on complex, aggressive, or uncommon cancers.

602 — Nineteen hospitals make up the National Comprehensive Cancer Network (NCCN). The program began in 1995 "to develop a comprehensive set of diagnostic, treatment, and supportive care guidelines." The guidelines are designed to guide medical decision making in cancer care. Forty-five panels cover 95% of "tumors encountered in oncology practices."

603 — For example, in breast cancer patient attributes, more evidence, and the expert guidance of MSK than as AC followed by Taxane, ve Oncology considers more do the NCCN Guidelines.

FIG. 6

501' — The NCCN guidelines consider a very small set of patient attributes when compared to
603' — cancer-related medical care services.

For example, in breast cancer, when trying to decide between an aggressive chemotherapy, such as AC followed by Taxane, versus a less aggressive chemotherapy, such as CMF, Watson for Oncology considers more patient attributes, more evidence, and the expert guidance of MSK than do the NCCN Guidelines.

704

502' — The following factors are considered: patient age, performance status, sickness that happens —703 along with other sicknesses, special concerns about poisonous qualities for heart, liver, organ 705 — that creates urine, etc, multifocal status, Tumor size and *histology*
706 —

When Mary found more hard sent matched her

| Chemotherapy is a drug treatment that uses powerful chemicals to kill fast-growing cells in your body. Chemotherapy is most often used to treat cancer, since cancer cells grow and multiply much more quickly than most cells in the body. Many different chemotherapy drugs are available. —701 |

| At what stage of cancer is chemotherapy used? Metastatic cancer is considered stage IV. Chemotherapy is used to treat advanced-stage breast cancer by destroying or damaging the cancer cells as much as possible. Because chemotherapy medicines affect the entire body, chemotherapy is commonly used to treat advanced-stage breast cancer. —702 |

FIG. 7

IDENTIFYING AND TRANSFORMING TEXT DIFFICULT TO UNDERSTAND BY USER

TECHNICAL FIELD

The present disclosure relates generally to software tools for reading comprehension, and more particularly to identifying and transforming text difficult to understand by the user, such as by including additional information (e.g., additional paragraphs) to provide further background knowledge on the subject matter deemed difficult to understand by the user so as to improve readability by the user.

BACKGROUND

Reading comprehension is the ability to process text, understand its meaning, and to integrate with what the reader already knows. Some fundamental skills that may be needed for reading comprehension include knowing the meaning of the words, having the ability to understand the meaning of a word from discourse context, having the ability to follow the organization of the passage, having the ability to identify antecedents and references in it, having the ability to draw inferences from a passage about its contents, having the ability to identify the main thought of a passage, having the ability to answer questions answered in a passage, having the ability to recognize the literary devices or propositional structures used in a passage and determine its tone, etc.

Every reader though possess a difficult degree of such skills. As a result, some text may be understood by some readers but not by other readers. For example, some readers may not have any background knowledge in a technical field, such as artificial intelligence, and, as a result, may have difficulty in understanding an article involving such a topic.

Currently, there are various software tools that attempt to improve a user's reading comprehension ability, such as by replacing words or phrases that are deemed to be difficult to understand with simpler words. However, such tools are based on words or phrases that are commonly deemed to be difficult to the user which may or may not be the case for the user in question. Furthermore, such term replacement may not assist the user in understanding the text, such as in the case where the user does not have background knowledge in the topic discussed in the text.

SUMMARY

In one embodiment of the present disclosure, a computer-implemented method for improving understandability of text by a user comprises receiving a document. The method further comprises computing a final word vector for each word in a sentence of the document. The method additionally comprises vectorizing elements of a user portrait, where the user portrait comprises a tagged user model abstracted based on user attributes and user preferences, and where the elements comprise the user attributes and the user preferences. Furthermore, the method comprises computing a distance between a vector for each word in the sentence and a vectorized element in the user's portrait which is summed to form an evaluation result for the element. Additionally, the method comprises forming an evaluation result for every other element in the user's portrait by performing the computation step. In addition, the method comprises generating a final evaluation result corresponding to the evaluation results for every element in the user's portrait. The method further comprises transforming the document in response to the final evaluation result indicating a lack of understanding of the sentence by the user.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 5 is an exemplary section of text from a document to be analyzed in connection with the user's portrait to determine if it is likely that the user lacks understanding of the meaning of any of the sentences in the text in accordance with an embodiment of the present disclosure;

FIG. 6 illustrates an example of transforming the document by including additional text (e.g., additional paragraphs) to provide further background knowledge on the subject matter deemed difficult to understand by the user in accordance with an embodiment of the present disclosure; and FIG. 7 illustrates another example of transforming the document by including additional text (e.g., additional paragraphs) to provide further background knowledge on the subject matter deemed difficult to understand by the user in accordance with an embodiment of the present disclosure.

DETAILED DESCRIPTION

Figure 1:
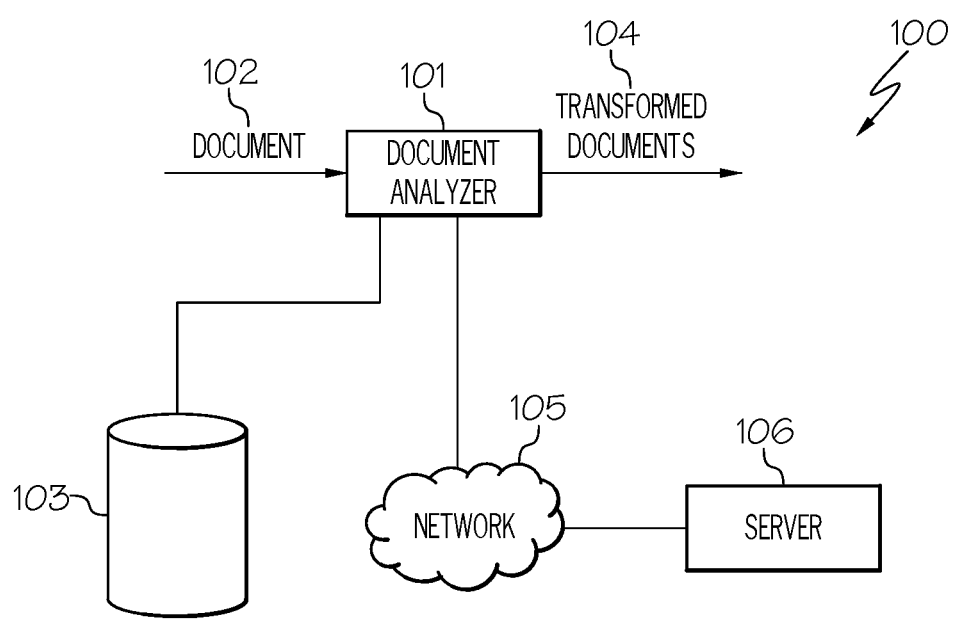
FIG. 1 illustrates a communication system for practicing the principles of the present disclosure in accordance with an embodiment of the present disclosure.

As stated in the Background section, reading comprehension is the ability to process text, understand its meaning, and to integrate with what the reader already knows. Some fundamental skills that may be needed for reading comprehension include knowing the meaning of the words, having the ability to understand the meaning of a word from discourse context, having the ability to follow the organization of the passage, having the ability to identify antecedents and references in it, having the ability to draw inferences from a passage about its contents, having the ability to identify the main thought of a passage, having the ability to answer questions answered in a passage, having the ability to recognize the literary devices or propositional structures used in a passage and determine its tone, etc.

Every reader though possess a difficult degree of such skills. As a result, some text may be understood by some readers but not by other readers. For example, some readers may not have any background knowledge in a technical field, such as artificial intelligence, and, as a result, may have difficulty in understanding an article involving such a topic.

Currently, there are various software tools that attempt to improve a user's reading comprehension ability, such as by replacing words or phrases that are deemed to be difficult to understand with simpler words. However, such tools are based on words or phrases that are commonly deemed to be difficult to the user which may or may not be the case for the user in question. Furthermore, such term replacement may not assist the user in understanding the text, such as in the case where the user does not have background knowledge in the topic discussed in the text.

In another example, a software tool forms an outline based on main ideas highlighted by the user in an attempt to improve the user's reading comprehension ability. However, if the user does not fully understand the meaning of the text, it will be difficult for the user to highlight the main ideas. Furthermore, simply providing an outline may not assist the user in understanding the text, such as in the case where the user lacks sufficient knowledge in the topic discussed in the text.

In a further example, a software tool enables the user to visually map the details of the text in an attempt to improve the user's reading comprehension ability. However, such a tool does not assist the user in understanding the meaning of such details. For example, if the user does not understand the meaning of such details in the text, then the mere fact of having such details visually mapped will most likely not assist the user in understanding such text.

As a result, such software tools are deficient in improving the readability of the text by the user.

The embodiments of the present disclosure provide a means for improving the readability of the text by the user by identifying sentences in a document that are difficult for the user to understand and then transforming the document by including additional information (e.g., paragraphs of information) to provide further background knowledge on the subject matter deemed difficult to understand by the user so as to improve readability by the user.

In some embodiments of the present disclosure, the present disclosure comprises a computer-implemented method, system and computer program product for improving understandability of text by a user. In one embodiment of the present disclosure, a document is received, such as a document containing technical content. A final word vector for each word in a sentence of the document is computed, such as by averaging a first word vector and a second word vector for that word. In one embodiment, the first word vector for the word is generated in a first part of a sentence using a first word embedding model and the second word vector for the word is generated in a second part of the sentence using a second word embedding model. In one embodiment, the first and second parts of the sentence each contain the word whose final word vector is computed. Furthermore, elements of a user portrait are vectorized. A "user portrait," as used herein, refers to a tagged user model abstracted based on user attributes, user preferences, lifestyle habits, user behavior and the like. Such user portraits may be associated with particular users. In one embodiment, the elements in the user portraits correspond to such user attributes, user preferences, lifestyle habits of the user, user behavior, etc. A distance is computed between a vector for each word in the sentence and a vectorized element in the user's portrait which is summed to form an evaluation result for the element. An evaluation result is also formed for every other element in the user's portrait by performing such a computation step. A "final evaluation result" is then generated corresponding to the evaluation results for every element in the user's portrait. The document is then transformed in response to the final evaluation result indicating a lack of understanding of the sentence by the user. In one embodiment, the document is transformed by adding additional information (e.g., additional paragraphs) in the document to provide further background knowledge on the subject matter deemed difficult to understand by the user so as to improve readability by the user. In one embodiment, the subject matter deemed difficult to understand by the user corresponds to the topic of the sentences that are deemed difficult to understand by the user. In this manner, readability of the text is improved by identifying sentences in a document that are difficult for the user to understand and then transforming the document by including additional information (e.g., paragraphs of information) to provide further background knowledge on the subject matter deemed difficult to understand by the user so as to improve readability by the user.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for identifying sentences in a document that are difficult for the user to understand and then transforming the document to improve the readability of the document by the user. As shown in FIG. 1, communication system 100 includes a document analyzer 101 that receives a document 102 to determine if there are any sentences in document 102 that are difficult for a particular user to understand. Such an analysis utilizes "user portraits," which are stored in a database 103 connected to document analyzer 101. A "user portrait," as used herein, refers to a tagged user model abstracted based on user attributes, user preferences, lifestyle habits, user behavior and the like. Such user portraits may be associated with particular users. As a result, when document analyzer 101 analyzes document 102 to determine if there are any sentences in document 102 that are difficult for a user to understand, such an analysis involves utilizing a user portrait for that user as discussed further below.

If document analyzer 101 determines that there are sentences in document 102 that are difficult for the user in question to understand, then document analyzer 101 transforms the document (transformed document 104) in a manner that improves the readability of the document. For example, in one embodiment, document analyzer 101 includes additional information (e.g., additional paragraphs) in the document to provide further background knowledge on the subject matter deemed difficult to understand by the user so as to improve readability by the user. In one embodiment, the subject matter deemed difficult to understand by the user corresponds to the topic of the sentences that are deemed difficult to understand by the user. In one embodiment, such additional information may be gathered by performing a search online for material related to the topic of these sentences, such as via a network 105, where such material is provided by a server 106 connected to network 105.

A description of the software components of document analyzer 101 used to identify and transform text difficult to understand by the user is provided below in connection with FIG. 2. A description of the hardware configuration of document analyzer 101 is provided further below in connection with FIG. 3.

Network 105 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, server 106 is configured to host websites (website is a collection of relevant webpages that is addressed to a Uniform Resource Locator (URL)) and serve contents to the World Wide Web. For example, server 106 may host a website in which its collection of relevant webpages are accessed by document analyzer 101. Furthermore, server 106 is configured to process incoming network requests over HTTP (Hypertext Transfer Protocol) and several other related protocols.

System 100 is not to be limited in scope to any one particular network architecture. System 100 may include any number of document analyzers 101, databases 103, networks 105 and servers 106.

A discussion regarding the software components used by document analyzer 101 to identify and transform text difficult to understand by the user is discussed below in connection with FIG. 2.

Figure 2:
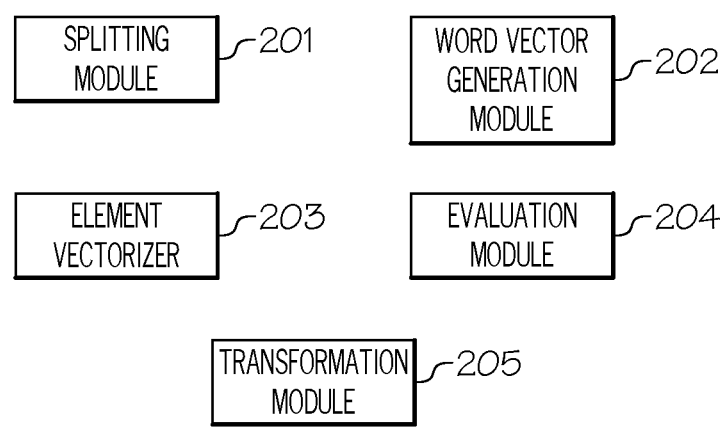
FIG. 2 is a diagram of the software components used by the document analyzer to identify and transform text difficult to understand by the user in accordance with an embodiment of the present disclosure.

Referring to FIG. 2, in conjunction with FIG. 1, document analyzer 101 includes a splitting module 201 configured to split each sentence of a document 102 into two parts (a $1^{st}$ part and a $2^{nd}$ part), where each part contains a same word, which is referred to herein as the "label." In one embodiment, splitting module 201 utilizes natural language processing to identify sentences, such as by identifying a capital letter that followed certain types of punctuation (e.g., periods, exclamation points, etc.). The sentence would then consist of the word with the capital letter along with the following words until the detection of certain types of punctuation (e.g., periods, exclamation points, etc.). In one embodiment, in order to obtain a better understanding of the meaning of each word in the sentence, splitting module 201 splits the sentence in a manner that includes the same word (label) but different words preceding and/or succeeding the label. For example, in the sentence "Even though the boy's bat broke, the boy successfully reached first base," splitting module 201 may split the sentence into two parts that both include the term "bat" to determine if the term "bat" refers to an implement for hitting a ball or a mammal. For instance, splitting module 201 may split the sentence into the $1^{st}$ and $2^{nd}$ parts of "Even though the boy's bat" and "bat broke, the boy successfully reached first base," respectively. Each of the $1^{st}$ and $2^{nd}$ parts includes the term "bat," which is referred to herein as the "label." By splitting the sentence in such a manner, the meaning of the label, especially words that may have different meanings, will be better understood. For example, based on the words surrounding the term "bat," such as "broke" and "first base" in the 2nd part, it will provide clarity to the meaning of the term "bat" as corresponding to an implement for hitting a ball as opposed to being a mammal.

In one embodiment, splitting module 201 performs such a procedure (splitting each sentence into two parts), where each part contains the same word (label), for each word in the sentence. In one embodiment, for words at the beginning of the sentence, such as the first term, each split (part) may contain a different number of subsequent terms, including skipping adjacent terms. For example, referring to the above example, splitting module 201 may split the sentence for the label of "Even" into the 1st and 2nd parts of "Even though the boy's bat broke" and "Even . . . the boy successfully reached first base," respectively. In one embodiment, words at the ending of the sentence are similarly split.

In one embodiment, splitting module 201 determines the number of words to be included in each part based on tabulating the number of words in a sentence and dividing by two. Splitting module 201 then splits the sentence in the manner discussed above by including approximately half of the words in the sentence in each part ($1^{st}$ and $2^{nd}$ part). For example, if a sentence contains 10 words, then each part may contain 5 terms. In one embodiment, if the result of dividing the number of words in a sentence by two is not an even number, then the result is rounded upwards. For example, if a sentence has five words, then the result of dividing the number of words in a sentence by two would be equal to 2.5. After rounding such a result upwards, the result becomes equal to 3. As a result, splitting module 201 splits the sentence in the manner discussed above in which the 1st part may contain 2 or 3 words and the 2nd part may contain 3 or 2 words, respectively.

Document analyzer 101 further includes a word vector generation module 202 configured to vectorize each word in a sentence of document 102, such as representing each word as a vector. In one embodiment, such a representation of the word is in the form of a real-valued vector that encodes the meaning of the word such that the words that are closer in the vector space are expected to be similar in meaning. In one embodiment, word embeddings (term used for the representation of words in the form of a real-valued vector that encodes the meaning of the word such that the words that are closer in the vector space are expected to be similar in meaning) can be obtained using a set of language modeling and feature learning techniques where words or phrases from the vocabulary are mapped to vectors of real numbers.

In one embodiment, methods to generate this mapping include neural networks, dimensionality reduction on the word co-occurrence matrix, probabilistic models, explainable knowledge base methods, and explicit representation in terms of the context in which words appear.

In one embodiment, document analyzer 101 utilizes the word2vec algorithm, a word embedding toolkit, which uses a neural network model to learn word associations from a large corpus of text. Once trained, such a model can detect synonymous words or suggest additional words for a partial sentence. In one embodiment, word2vec represents each distinct word with a particular list of numbers called a vector. The vectors are chosen carefully such that a simple mathematical function (e.g., the cosine similarity between the vectors) indicates the level of semantic similarity between the words represented by those vectors.

In one embodiment, a word embedding is constructed by the word2vec algorithm using two methods: skip gram and common bag of words (CBOW).

In the CBOW model, such a method takes the context of each word as the input and tries to predict the word corresponding to the context. For example, in the sentence "Have a great day," suppose that the input to the neural network is the word "great." In the CBOW model, the model is attempting to predict a target word "day" using the single context input word "great." In one embodiment, one hot encoding is used on the input word. "One hot encoding," as used herein, refers to a method of converting data to prepare it for an algorithm (e.g., word2vec) to obtain a better prediction. With one hot encoding, each categorical value is converted into a new categorical column and a binary value of 1 or 0 is assigned to those columns. Each integer value is then represented as a binary vector.

After performing one hot encoding on the input word, the output error is measured and compared to the one hot encoding of the target word (day). In the process of predicting the target word, the vector representation of the target word is learned.

In the skip gram model though, the target word (whose representation is desired to be generated) is used to predict the content, and in the process, representations are produced.

Another example of a word embedding model includes Stanford's GloVe, which corresponds to an unsupervised learning algorithm for obtaining vector representations for words. Training is performed on aggregated global word-word co-occurrence statistics from a corpus, and the resulting representation includes linear substructures of the word vector space.

A further example of a word embedding model includes the FastText model from Facebook®, which uses character n-grams and an efficient learning process to learn embeddings out of the vocabulary words. In particular, the FastText model allows one to create an unsupervised learning or supervised learning algorithm for obtaining vector representations for words.

In one embodiment, word vector generation module 202 utilizes multiple word embedding models (e.g., word2vec algorithm, GloVe algorithm) to increase the accuracy in vectorizing a word, such as a first word embedding model to represent a word from the Pt part of the sentence as a vector ("$1^{st}$ word vector") and a second word embedding model to represent the same word from the 2nd part of the sentence as a vector ("2nd word vector"). These vectors ("$1^{st}$ and 2nd word vectors") are then averaged forming a final word vector for the word. For example, the final word vector for the word is equal to: ($1^{st}$ word vector+$2^{nd}$ word vector)/2. In one embodiment, such an average is computed by item-wise averaging.

Furthermore, as shown in FIG. 2, document analyzer 101 includes an element vectorizer 203 configured to vectorize the elements in the user portraits stored in database 103. As previously discussed, a user portrait refers to a tagged user model abstracted based on user attributes, user preferences, lifestyle habits, user behavior and the like. Such user portraits may be associated with particular users. In one embodiment, such user portraits are akin to a user profile that includes text describing the user based on such attributes, user preferences, lifestyle habits, user behavior and the like. For example, the user profile may include text indicating the interests of the user.

In one embodiment, the elements in the user portraits correspond to such user attributes, user preferences, lifestyle habits of the user, user behavior, etc. For example, the user attributes and lifestyle habits may correspond to interests of the user, such as playing baseball, traveling, swimming, hiking, database servers, such as DB2®, etc.

In one embodiment, element vectorizer 203 searches and identifies text in the user profile using natural language processing that correspond to such elements. Element vectorizer 203 then vectorizes such elements in the same manner as word vector generation module 202. For example, word embeddings (term used for the representation of words in the form of a real-valued vector that encodes the meaning of the word such that the words that are closer in the vector space are expected to be similar in meaning) can be obtained using a set of language modeling and feature learning techniques where words or phrases from the vocabulary are mapped to vectors of real numbers.

In one embodiment, methods to generate this mapping include neural networks, dimensionality reduction on the word co-occurrence matrix, probabilistic models, explainable knowledge base methods, and explicit representation in terms of the context in which words appear.

In one embodiment, element vectorizer 203 utilizes the word2vec algorithm, a word embedding toolkit, which uses a neural network model to learn word associations from a large corpus of text. Once trained, such a model can detect synonymous words or suggest additional words for a partial sentence. In one embodiment, word2vec represents each distinct word with a particular list of numbers called a vector. The vectors are chosen carefully such that a simple mathematical function (e.g., the cosine similarity between the vectors) indicates the level of semantic similarity between the words represented by those vectors.

After generating a vector to represent each word in a sentence by word vector generation module 202 and generating a vector to represent each element by element vectorizer 203, an evaluation module 204 of document analyzer 101 is used to compute a distance between a vector for each word in the sentence of document 102 and a vectorized element in the user's portrait (user portrait of the user in question) to determine if such a user has difficultly in understanding the meaning of the sentence as discussed below. In one embodiment, such a distance is the Euclidean distance.

For example, the Euclidean distance is between each word's vector in the sentence in question (word 1, word 2, . . . word N, where N is a positive integer number equal to the number of words in the sentence in question) and a vectorized element (e.g., element 1) in the user's portrait. The sum of such Euclidean distances divided by the number of words in the sentence in question forms what is referred to herein as the "evaluation result." For example, the evaluation result=SUM(Euclidean(word 1, element 1), Euclidean (word 2, element 1) . . . Euclidean (word N, element 1))/N, where N is a positive integer number corresponding to the number of words in the sentence.

In one embodiment, the Euclidean distance between the vectorized word in the sentence and the vectorized element in the user's portrait is an indication of how semantically similar is the word in the sentence in comparison to the element in the user's portrait. For example, the Euclidean distance between the term "database" and the element "DB2®" in the user's portrait will be very small since they are semantically similar in meaning (DB2® is a data management product developed by IBM®). In other words, the closer the distance between such vectors, the more similar is the semantic meaning between such words/element represented by such vectors and vice-versa. "Semantic meaning," as used herein, refers to knowing what the word or collection of words actually means. For instance, it can be inferred that the meaning of the term "bat" in the sentence involving the terms "ball" and "bat" refers to a baseball bat as opposed to being directed to a bat that is a mammal due to the fact that the word "ball" is used in close proximity to the term "bat."

Based on the Euclidean distance between the vectorized word in the sentence and the vectorized element in the user's portrait, an assumption may be made as to the understandability of the text by the user. For example, if the user has an interest in DB2® and the sentence involves text involving such subject matter, then it may be assumed that the user has a background knowledge to understand such subject matter. Hence, the closer the distance (the smaller the Euclidean distance) between the vectorized word in the sentence and the vectorized element in the user's portrait, the more likely the user has a background knowledge for understanding such subject matter.

Such a process (finding the Euclidean distance between each word's vector in the sentence in question and a vectorized element in the user's portrait) is then repeated for each element in the user's portrait to obtain what is referred to herein as the "final evaluation result," where the final evaluation result=SUM (evaluation result for element 1, evaluation result for element 2 . . . evaluation result for element N)/N, where N is a positive integer number equal to the number of elements in the user's portrait. In one embodiment, such a result is normalized, such as having the final evaluation result correspond to a number between 0 and 1. In one embodiment, such a final evaluation result is compared to a threshold value, which may be user-specified, to determine whether or not the user may have difficulty in understanding the meaning of the sentence. For example, in one embodiment, if the final evaluation result is less than a threshold value, then the user is likely to understand the meaning of the sentence. In contrast, if the final evaluation result is not less than the threshold value, then the user is likely to have difficulty in understanding the meaning of the sentence.

If it is determined that the user may have difficulty in understanding the meaning of the sentence, such as having the final evaluation result not being less than the threshold value, then transformation module 205 of document analyzer 101 transforms document 102, such as by adding additional information (e.g., additional paragraphs) in the document to provide further background knowledge on the subject matter deemed difficult to understand by the user so as to improve readability by the user.

In one embodiment, the subject matter deemed difficult to understand by the user corresponds to the topic of the sentences that are deemed difficult to understand by the user. As discussed above, such sentences are identified by having the final evaluation result corresponding to that sentence not being less than a threshold value.

In one embodiment, transformation module 205 determines the topic of such sentences using natural language processing. A "topic," as used herein, refers to a high-level concept that is the subject of the context of a sentence. In one embodiment, such topics may be identified based on identifying keywords in the text of the sentence in question. Such keywords are stored in data structures, such as a table. Each keyword may be associated with a topic, which is also stored in such data structures. Based on matching one or more keywords in the data structure to terms used in the sentence, one or more topics (e.g., database, traveling, swimming, integrated circuits) of the sentence may be identified. Alternatively, such keywords themselves may be topics. As a result, by matching a keyword/topic stored in a data structure to a term used in the sentence, the topic of the sentence may be identified. In one embodiment, such data structures are stored in a storage device (e.g., memory, disk drive) of document analyzer 101. In one embodiment, such data structures are stored in database 103.

In one embodiment, the topic of the sentence may be determined using natural language processing by identifying the subject of the sentence.

Upon identifying the topic of the sentence, additional information pertaining to the topic may be gathered by performing a search online for material related to the topic, such as via network 105, where such material is provided by server 106 connected to network 105. For example, if the topic of the sentence that appears to be causing the user difficulty in understanding is takotsubo cardiomyopathy, then transformation module 205 performs a search online for background information related to takotsubo cardiomyopathy. Such a search may involve simply using the term "takotsubo cardiomyopathy" and identifying definitions of such a term on websites, such as identifying phrases (e.g., "is a") following the term "takotsubo cardiomyopathy." For example, transformation module 205 may identify the definition of takotsubo cardiomyopathy based on identifying the phrase "takotsubo cardiomyopathy is a temporary heart condition that develops in response to an intense emotional or physical experience" on a webpage. Such text may be extracted from the webpage and inserted into document 102 near the sentence in question to provide the user some background knowledge pertaining to such a topic (takotsubo cardiomyopathy in this example).

In one embodiment, transformation module 205 utilizes IBM Watson® Discovery to implement the transformation of document 102 as discussed above. In another embodiment, transformation module 205 utilizes ERNIE 2.0 by Baidu® Research to implement the transformation of document 102 as discussed above.

A further description of these and other functions is provided below in connection with the discussion of the method for improving the understandability of text by a user.

Prior to the discussion of the method for improving the understandability of text by a user, a description of the hardware configuration of document analyzer 101 (FIG. 1) is provided below in connection with FIG. 3.

Figure 3:
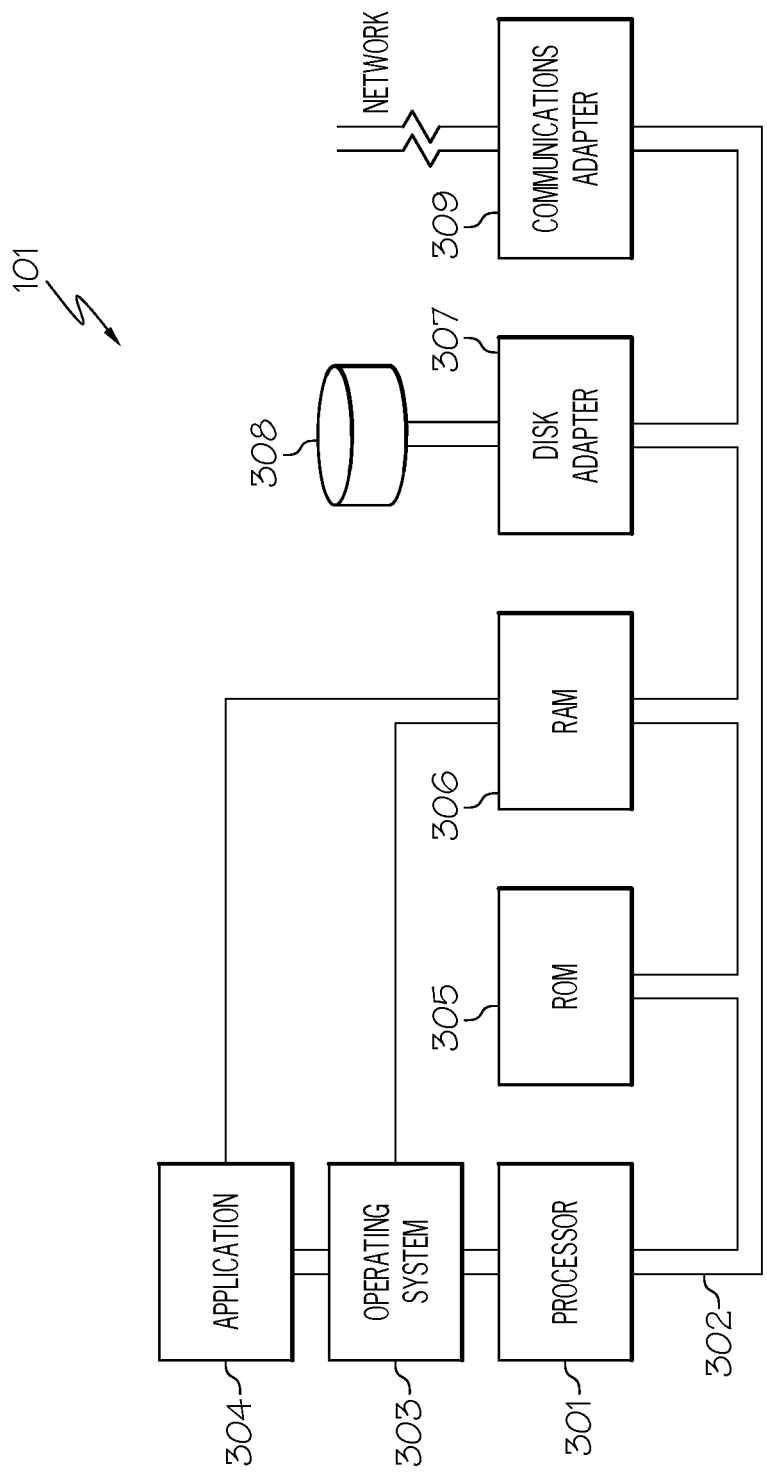
FIG. 3 illustrates an embodiment of the present disclosure of the hardware configuration of the document analyzer which is representative of a hardware environment for practicing the present disclosure.

Referring now to FIG. 3, FIG. 3 illustrates an embodiment of the present disclosure of the hardware configuration of document analyzer 101 (FIG. 1) which is representative of a hardware environment for practicing the present disclosure.

Document analyzer 101 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, splitting module 201 (FIG. 2), word vector generation module 202 (FIG. 2), element vectorizer 203 (FIG. 2), evaluation module 204 (FIG. 2) and transformation module 205 (FIG. 2). Furthermore, application 304 may include, for example, a program for identifying and transforming text difficult to understand by the user as discussed further below in connection with FIGS. 4A-4B and 5-7.

Referring again to FIG. 3, read-only memory ("ROM") 305 is connected to system bus 302 and includes a basic input/output system ("BIOS") that controls certain basic functions of document analyzer 101. Random access memory ("RAM") 306 and disk adapter 307 are also connected to system bus 302. It should be noted that software components including operating system 303 and application 304 may be loaded into RAM 306, which may be document analyzer's 101 main memory for execution. Disk adapter 307 may be an integrated drive electronics ("IDE") adapter that communicates with a disk unit 308, e.g., disk drive. It is noted that the program for identifying and transforming text difficult to understand by the user, as discussed further below in connection with FIGS. 4A-4B and 5-7, may reside in disk unit 308 or in application 304.

Document analyzer 101 may further include a communications adapter 309 connected to bus 302. Communications adapter 309 interconnects bus 302 with an outside network (e.g., network 105 of FIG. 1) to communicate with other devices, such as server 106 of FIG. 1.

In one embodiment, application 304 of document analyzer 101 includes the software components of splitting module 201, word vector generation module 202, element vectorizer 203, evaluation module 204 and transformation module 205. In one embodiment, such components may be implemented in hardware, where such hardware components would be connected to bus 302. The functions discussed above performed by such components are not generic computer functions. As a result, document analyzer 101 is a particular machine that is the result of implementing specific, non-generic computer functions.

In one embodiment, the functionality of such software components (e.g., splitting module 201, word vector generation module 202, element vectorizer 203, evaluation module 204 and transformation module 205) of document analyzer 101, including the functionality for identifying and transforming text difficult to understand by the user, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, there are various software tools that attempt to improve a user's reading comprehension ability, such as by replacing words or phrases that are deemed to be difficult to understand with simpler words. However, such tools are based on words or phrases that are commonly deemed to be difficult to the user which may or may not be the case for the user in question. Furthermore, such term replacement may not assist the user in understanding the text, such as in the case where the user does not have background knowledge in the topic discussed in the text. In another example, a software tool forms an outline based on main ideas highlighted by the user in an attempt to improve the user's reading comprehension ability. However, if the user does not fully understand the meaning of the text, it will be difficult for the user to highlight the main ideas. Furthermore, simply providing an outline may not assist the user in understanding the text, such as in the case where the user lacks sufficient knowledge in the topic discussed in the text. In a further example, a software tool enables the user to visually map the details of the text in an attempt to improve the user's reading comprehension ability. However, such a tool does not assist the user in understanding the meaning of such details. For example, if the user does not understand the meaning of such details in the text, then the mere fact of having such details visually mapped will most likely not assist the user in understanding such text. As a result, such software tools are deficient in improving the readability of the text by the user.

Figure 4A:
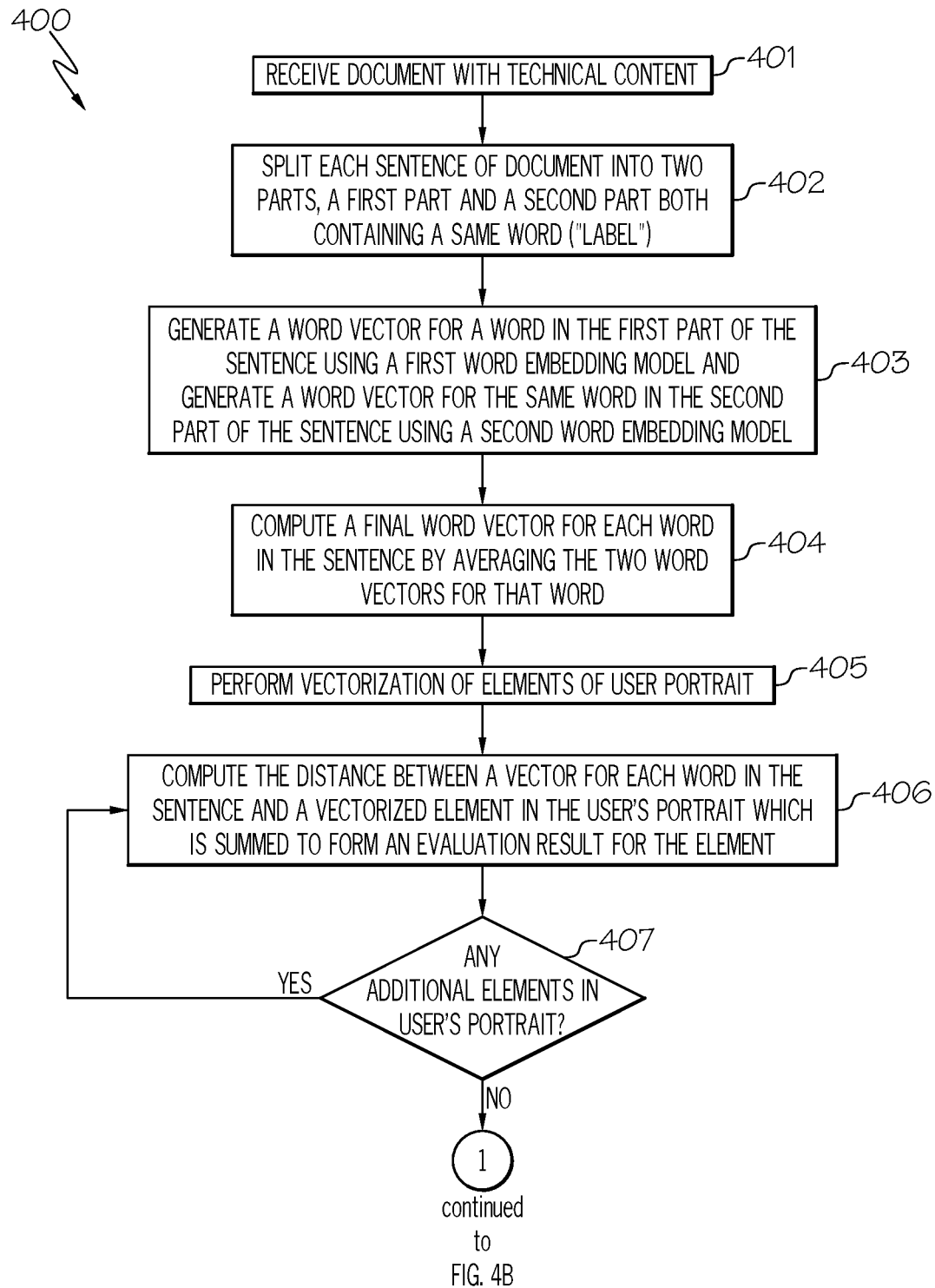
FIGS. 4A-4B are a flowchart of a method for improving the understandability of text by a user in accordance with an embodiment of the present disclosure.
Figure 4B:
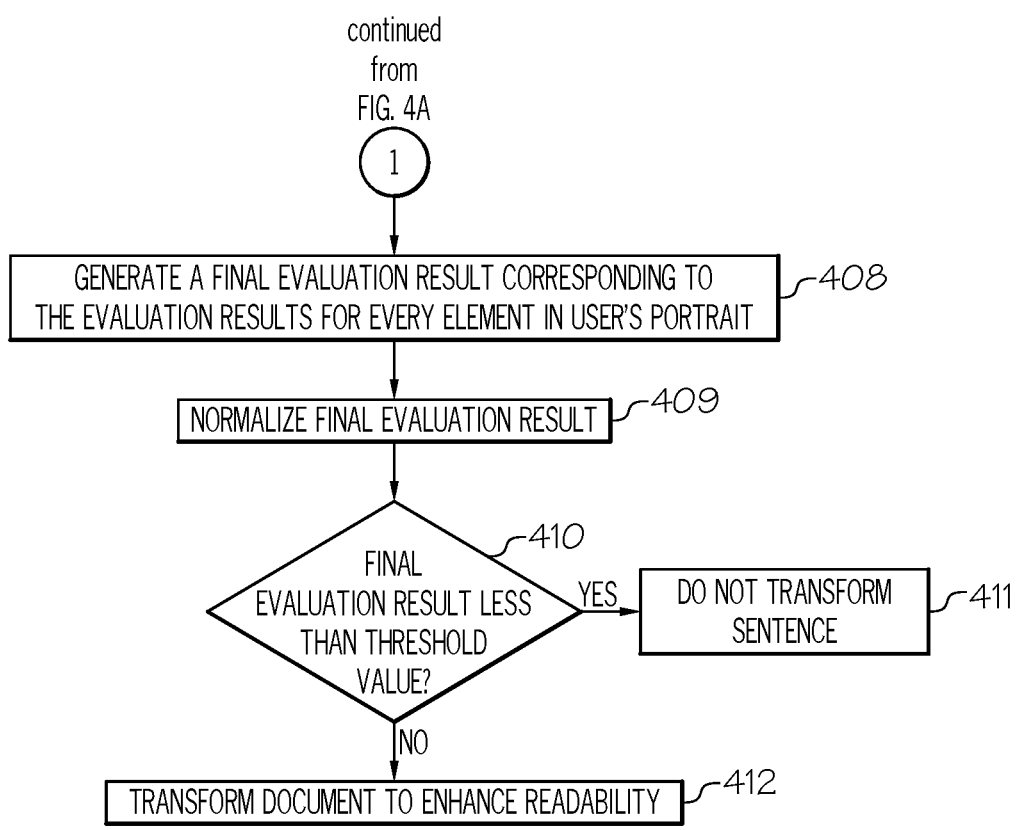

The embodiments of the present disclosure provide a means for improving the readability of the text by the user by identifying sentences in a document that are difficult for the user to understand and then transforming the document by including additional information (e.g., additional paragraphs) to provide further background knowledge on the subject matter deemed difficult to understand by the user so as to improve readability by the user as discussed below in connection with FIGS. 4A-4B and 5-7. FIGS. 4A-4B are a flowchart of a method for improving the understandability of text by a user. FIG. 5 is an exemplary section of text from a document to be analyzed in connection with the user's portrait to determine if it is likely that the user lacks understanding of the meaning of any of the sentences in the text. FIG. 6 illustrates an example of transforming the document by including additional text (e.g., additional paragraphs) to provide further background knowledge on the subject matter deemed difficult to understand by the user. FIG. 7 illustrates another example of transforming the document by including additional text (e.g., additional paragraphs) to provide further background knowledge on the subject matter deemed difficult to understand by the user.

As stated above, FIGS. 4A-4B are a flowchart of a method 400 for improving the understandability of text by a user in accordance with an embodiment of the present disclosure.

Referring to FIG. 4A, in conjunction with FIGS. 1-3, in step 401, document analyzer 101 receives a document 102 to be analyzed. In one embodiment, such a document includes technical content. For example, such a document may correspond to a technical publication. In such an example, if the intended reader (user) does not possess a background knowledge in such content, then the user may have difficulty in understanding the document.

In step 402, spitting module 201 of document analyzer 101 splits each sentence of document 102 into two parts (a 1st part and a 2nd part) both containing a same word ("label"). As discussed above, splitting module 201 is configured to split each sentence of document 102 into two parts (a 1st part and a 2nd part), where each part contains a same word, which is referred to herein as the "label." In one embodiment, splitting module 201 utilizes natural language processing to identify sentences, such as by identifying a capital letter that followed certain types of punctuation (e.g., periods, exclamation points, etc.). The sentence would then consist of the word with the capital letter along with the following words until the detection of certain types of punctuation (e.g., periods, exclamation points, etc.). In one embodiment, in order to obtain a better understanding of the meaning of each word in the sentence, splitting module 201 splits the sentence in a manner that includes the same word (label) but different words preceding and/or succeeding the label. For example, in the sentence "Even though the boy's bat broke, the boy successfully reached first base," splitting module 201 may split the sentence into two parts that both include the term "bat" to determine if the term "bat" refers to an implement for hitting a ball or a mammal. For instance, splitting module 201 may split the sentence into the $1^{st}$ and 2nd parts of "Even though the boy's bat" and "bat broke, the boy successfully reached first base," respectively. Each of the $1^{st}$ and 2nd parts includes the term "bat," which is referred to herein as the "label." By splitting the sentence in such a manner, the meaning of the label, especially words that may have different meanings, will be better understood. For example, based on the words surrounding the term "bat," such as "broke" and "first base" in the 2nd part, it will provide clarity to the meaning of the term "bat" as corresponding to an implement for hitting a ball as opposed to being a mammal.

In one embodiment, splitting module 201 performs such a procedure (splitting each sentence into two parts), where each part contains the same word (label), for each word in the sentence. In one embodiment, for words at the beginning of the sentence, such as the first term, each split (part) may contain a different number of subsequent terms, including skipping adjacent terms. For example, referring to the above example, splitting module 201 may split the sentence for the label of "Even" into the $1^{st}$ and 2nd parts of "Even though the boy's bat broke" and "Even . . . the boy successfully reached first base," respectively. In one embodiment, words at the ending of the sentence are similarly split.

In one embodiment, splitting module 201 determines the number of words to be included in each part based on tabulating the number of words in a sentence and dividing by two. Splitting module 201 then splits the sentence in the manner discussed above by including approximately half of the words in the sentence in each part ($1^{st}$ and 2nd part). For example, if a sentence contains 10 words, then each part may contain 5 terms. In one embodiment, if the result of dividing the number of words in a sentence by two is not an even number, then the result is rounded upwards. For example, if a sentence has five words, then the result of dividing the number of words in a sentence by two would be equal to 2.5. After rounding such a result upwards, the result becomes equal to 3. As a result, splitting module 201 splits the sentence in the manner discussed above in which the $1^{st}$ part may contain 2 or 3 words and the 2nd part may contain 3 or 2 words, respectively.

In step 403, word vector generation module 202 of document analyzer 101 generates a word vector for a word in the first part of the sentence using a first word embedding model (e.g., word2vec algorithm) and generates a word vector for the same word in the second part of the sentence using a second word embedding model (e.g., GloVe algorithm).

As stated above, word vector generation module 202 is configured to vectorize each word in a sentence of document 102, such as representing each word as a vector. In one embodiment, such a representation of the word is in the form of a real-valued vector that encodes the meaning of the word such that the words that are closer in the vector space are expected to be similar in meaning. In one embodiment, word embeddings (term used for the representation of words in the form of a real-valued vector that encodes the meaning of the word such that the words that are closer in the vector space are expected to be similar in meaning) can be obtained using a set of language modeling and feature learning techniques where words or phrases from the vocabulary are mapped to vectors of real numbers.

In one embodiment, methods to generate this mapping include neural networks, dimensionality reduction on the word co-occurrence matrix, probabilistic models, explainable knowledge base methods, and explicit representation in terms of the context in which words appear.

In one embodiment, document analyzer 101 utilizes the word2vec algorithm, a word embedding toolkit, which uses a neural network model to learn word associations from a large corpus of text. Once trained, such a model can detect synonymous words or suggest additional words for a partial sentence. In one embodiment, word2vec represents each distinct word with a particular list of numbers called a vector. The vectors are chosen carefully such that a simple mathematical function (e.g., the cosine similarity between the vectors) indicates the level of semantic similarity between the words represented by those vectors.

In one embodiment, a word embedding is constructed by the word2vec algorithm using two methods: skip gram and common bag of words (CBOW).

Another example of a word embedding model includes Stanford's GloVe, which corresponds to an unsupervised learning algorithm for obtaining vector representations for words. Training is performed on aggregated global word-word co-occurrence statistics from a corpus, and the resulting representation includes linear substructures of the word vector space.

A further example of a word embedding model includes the FastText model from Facebook®, which uses character n-grams and an efficient learning process to learn embeddings out of the vocabulary words. In particular, the FastText model allows one to create an unsupervised learning or supervised learning algorithm for obtaining vector representations for words.

In one embodiment, word vector generation module 202 utilizes multiple word embedding models (e.g., word2vec algorithm, GloVe algorithm) to increase the accuracy in vectorizing a word, such as a first word embedding model to represent a word from the Pt part of the sentence as a vector ("$1^{st}$ word vector") and a second word embedding model to represent the same word from the 2nd part of the sentence as a vector ("2nd word vector").

In step 404, word vector generation module 202 of document analyzer 101 computes a final word vector for each word in the sentence by averaging the two word vectors (see step 403) for that word. As discussed above, word vector generation module 202 averages these vectors for the word ("$1^{st}$ and 2nd word vectors") forming a final word vector for the word. For example, the final word vector is equal to: ($1^{st}$ word vector+2nd word vector)/2. In one embodiment, such an average is computed by item-wise averaging.

In step 405, element vectorizer 203 of document analyzer 101 vectorizes the elements of a user portrait.

As previously discussed, a user portrait refers to a tagged user model abstracted based on user attributes, user preferences, lifestyle habits, user behavior and the like. Such user portraits may be associated with particular users. In one embodiment, such user portraits are akin to a user profile that includes text describing the user based on such attributes, user preferences, lifestyle habits, user behavior and the like. For example, the user profile may include text indicating the interests of the user.

In one embodiment, the elements in the user portraits correspond to such user attributes, user preferences, lifestyle habits of the user, user behavior, etc. For example, the user attributes and lifestyle habits may correspond to interests of the user, such as playing baseball, traveling, swimming, hiking, database servers, such as DB2®, etc.

In one embodiment, element vectorizer 203 searches and identifies text in the user profile using natural language processing that correspond to such elements. Element vectorizer 203 then vectorizes such elements in the same manner as word vector generation module 202. For example, word embeddings (term used for the representation of words in the form of a real-valued vector that encodes the meaning of the word such that the words that are closer in the vector space are expected to be similar in meaning) can be obtained using a set of language modeling and feature learning techniques where words or phrases from the vocabulary are mapped to vectors of real numbers.

In one embodiment, methods to generate this mapping include neural networks, dimensionality reduction on the word co-occurrence matrix, probabilistic models, explainable knowledge base methods, and explicit representation in terms of the context in which words appear.

In one embodiment, element vectorizer 203 utilizes the word2vec algorithm, a word embedding toolkit, which uses a neural network model to learn word associations from a large corpus of text. Once trained, such a model can detect synonymous words or suggest additional words for a partial sentence. In one embodiment, word2vec represents each distinct word with a particular list of numbers called a vector. The vectors are chosen carefully such that a simple mathematical function (e.g., the cosine similarity between the vectors) indicates the level of semantic similarity between the words represented by those vectors.

In step 406, evaluation module 204 of document analyzer 101 computes the distance between a vector for each word in the sentence and a vectorized element in the user's portrait which is summed to form an evaluation result for the element.

As discussed above, evaluation module 204 is used to compute a distance between a vector for each word in the sentence of document 102 and a vectorized element in the user's portrait (user portrait of the user in question) to determine if such a user has difficultly in understanding the meaning of the sentence. In one embodiment, such a distance is the Euclidean distance.

For example, the Euclidean distance is between each word's vector in the sentence in question (word 1, word 2, . . . word N, where N is a positive integer number equal to the number of words in the sentence in question) and a vectorized element (e.g., element 1) in the user's portrait. The sum of such Euclidean distances divided by the number of words in the sentence in question forms what is referred to herein as the "evaluation result." For example, the evaluation result=SUM(Euclidean(word 1, element 1), Euclidean (word 2, element 1) . . . Euclidean (word N, element 1))/N, where N is a positive integer number corresponding to the number of words in the sentence.

In one embodiment, the Euclidean distance between the vectorized word in the sentence and the vectorized element in the user's portrait is an indication of how semantically similar is the word in the sentence in comparison to the element in the user's portrait. For example, the Euclidean distance between the term "database" and the element "DB2®" in the user's portrait will be very small since they are semantically similar in meaning (DB2® is a data management product developed by IBM®). In other words, the closer the distance between such vectors, the more similar is the semantic meaning between such words/element represented by such vectors and vice-versa. "Semantic meaning," as used herein, refers to knowing what the word or collection of words actually means. For instance, it can be inferred that the meaning of the term "bat" in the sentence involving the terms "ball" and "bat" refers to a baseball bat as opposed to being directed to a bat that is a mammal due to the fact that the word "ball" is used in close proximity to the term "bat."

Based on the Euclidean distance between the vectorized word in the sentence and the vectorized element in the user's portrait, an assumption may be made as to the understandability of the text by the user. For example, if the user has an interest in DB2® and the sentence involves text involving such subject matter, then it may be assumed that the user has a background knowledge to understand such subject matter. Hence, the closer the distance (the smaller the Euclidean distance) between the vectorized word in the sentence and the vectorized element in the user's portrait, the more likely the user has a background knowledge for understanding such subject matter.

In step 407, a determination is made by evaluation module 204 of document analyzer 101 as to whether there are any additional elements in the user's portrait whose vectorized representation has not be used to compute the distance between a vector for each word in the sentence. If there are other elements in the user's portrait whose vectorized representation has not be used to compute the distance between a vector for each word in the sentence, then the process of step 406 is repeated such that the distance between a vector for each word in the sentence and the vectorized representation of this element in the user's portrait is computed.

Referring now to FIG. 4B, in conjunction with FIGS. 1-3, if, however, there are no other elements in the user's portrait whose vectorized representation has not be used to compute the distance between a vector for each word in the sentence, then, in step 408, evaluation module 204 of document analyzer 101 generates a final result ("final evaluation result") corresponding to the evaluation results for every element in the user's portrait.

As discussed above, the process of step 406 (finding the distance between each word's vector in the sentence in question and a vectorized element in the user's portrait) is repeated for each element in the user's portrait to obtain what is referred to herein as the "final evaluation result," where the final evaluation result=SUM (evaluation result for element 1, evaluation result for element 2 . . . evaluation result for element N)/N, where N is a positive integer number equal to the number of elements in the user's portrait.

In step 409, evaluation module 204 of document analyzer 101 normalizes the final evaluation result. As discussed above, normalization may involve having the final evaluation result correspond to a number between 0 and 1.

In step 410, a determination is made by evaluation module 204 of document analyzer 101 as to whether the final evaluation result (normalized final evaluation result) is less than a threshold value, which may be user-selected.

As discussed above, such a final evaluation result is compared to a threshold value, which may be user-specified, to determine whether or not the user may have difficulty in understanding the meaning of the sentence. For example, in one embodiment, if the final evaluation result is less than a threshold value, then the user is likely to understand the meaning of the sentence. In contrast, if the final evaluation result is not less than the threshold value, then the user is likely to have difficulty in understanding the meaning of the sentence.

Hence, if the final evaluation result is less than a threshold value (which may be user-specified), then, in step 411, a transformation of the sentence is not performed.

If, however, the final evaluation result is not less than the threshold value, then, in step 412, transformation module 205 of document analyzer 101 transforms document 102 to enhance readability.

As discussed above, if it is determined that the user may have difficulty in understanding the meaning of the sentence, such as having the final evaluation result not being less than the threshold value, then transformation module 205 of document analyzer 101 transforms document 102, such as by adding additional information (e.g., additional paragraphs) in the document to provide further background knowledge on the subject matter deemed difficult to understand by the user so as to improve readability by the user.

In one embodiment, the subject matter deemed difficult to understand by the user corresponds to the topic of the sentences that are deemed difficult to understand by the user. As discussed above, such sentences are identified by having the final evaluation result corresponding to that sentence not being less than a threshold value.

In one embodiment, transformation module 205 determines the topic of such sentences using natural language processing. A "topic," as used herein, refers to a high-level concept that is the subject of the context of a sentence. In one embodiment, such topics may be identified based on identifying keywords in the text of the sentence in question. Such keywords are stored in data structures, such as a table. Each keyword may be associated with a topic, which is also stored in such data structures. Based on matching one or more keywords in the data structure to terms used in the sentence, one or more topics (e.g., database, traveling, swimming, integrated circuits) of the sentence may be identified. Alternatively, such keywords themselves may be topics. As a result, by matching a keyword/topic stored in a data structure to a term used in the sentence, the topic of the sentence may be identified. In one embodiment, such data structures are stored in a storage device (e.g., memory, disk drive) of document analyzer 101. In one embodiment, such data structures are stored in database 103.

In one embodiment, the topic of the sentence may be determined using natural language processing by identifying the subject of the sentence.

Upon identifying the topic of the sentence, additional information pertaining to the topic may be gathered by performing a search online for material related to the topic, such as via network 105, where such material is provided by server 106 connected to network 105. For example, if the topic of the sentence that appears to be causing the user difficulty in understanding is takotsubo cardiomyopathy, then transformation module 205 performs a search online for background information related to takotsubo cardiomyopathy. Such a search may involve simply using the term "takotsubo cardiomyopathy" and identifying definitions of such a term on websites, such as identifying phrases (e.g., "is a") following the term "takotsubo cardiomyopathy." For example, transformation module 205 may identify the definition of takotsubo cardiomyopathy based on identifying the phrase "takotsubo cardiomyopathy is a temporary heart condition that develops in response to an intense emotional or physical experience" on a webpage. Such text may be extracted from the webpage and inserted into document 102 near the sentence in question to provide the user some background knowledge pertaining to such a topic (takotsubo cardiomyopathy in this example).

In one embodiment, transformation module 205 utilizes IBM Watson® Discovery to implement the transformation of document 102 as discussed above. In another embodiment, transformation module 205 utilizes ERNIE 2.0 by Baidu® Research to implement the transformation of document 102 as discussed above.

An example of transforming one or more sentences of a document to improve the understandability of the text is discussed below in connection with FIGS. 5-7.

FIG. 5 is an exemplary section of text 500 from a document to be analyzed in connection with the user's portrait by document analyzer 101 to determine if it is likely that the user lacks understanding of the meaning of any of the sentences in text 500 in accordance with an embodiment of the present invention.

For example, sentence 501 may be analyzed in connection with the user's portrait to assess the understandability of sentence 501 by the user. As discussed above, each word in sentence 501 is vectorized by word vector generation module 202, where the distance between the vector for each word in the sentence and the vectorized element in the user's portrait is summed to form an evaluation result for the result. Such a process is repeated for each element in the user's portrait to obtain what is referred to herein as the "final evaluation result," where the final evaluation result=SUM (evaluation result for element 1, evaluation result for element 2 . . . evaluation result for element N)/N, where N is a positive integer number equal to the number of elements in the user's portrait. After normalizing the final evaluation result, such a result is compared to a threshold value to determine if the user is likely to have difficulty in understanding the meaning of the sentence.

As discussed above, if the final evaluation result is not less than the threshold value, then transformation module 205 transforms the document, such as the sentence that contains subject matter that may likely be difficult for the user to understand. For example, if the final evaluation result for sentence 501 is not less than the threshold value, then transformation module 205 transforms the document by including additional text (e.g., additional paragraphs) to provide further background knowledge on the subject matter deemed difficult to understand by the user in sentence 501 as shown in FIG. 6.

In another example, sentence 502 may be analyzed in connection with the user's portrait to assess the understandability of sentence 502 by the user. As discussed above, each word in sentence 502 is vectorized by word vector generation module 202, where the distance between the vector for each word in the sentence and the vectorized element in the user's portrait is summed to form an evaluation result for the result. Such a process is repeated for each element in the user's portrait to obtain what is referred to herein as the "final evaluation result," where the final evaluation result=SUM (evaluation result for element 1, evaluation result for element 2 . . . evaluation result for element N)/N, where N is a positive integer number equal to the number of elements in the user's portrait. After normalizing the final evaluation result, such a result is compared to a threshold value to determine if the user is likely to have difficulty in understanding the meaning of the sentence.

As discussed above, if the final evaluation result is not less than the threshold value, then transformation module 205 transforms the document, such as the sentence that contains subject matter that may likely be difficult for the user to understand. For example, if the final evaluation result for sentence 502 is not less than the threshold value, then transformation module 205 transforms the document by including additional text (e.g., additional paragraphs) to provide further background knowledge on the subject matter deemed difficult to understand by the user in sentence 502 as shown in FIG. 7.

Referring now to FIG. 6, FIG. 6 illustrates an example of transforming the document by including additional text (e.g., additional paragraphs) to provide further background knowledge on the subject matter deemed difficult to understand by the user in accordance with an embodiment of the present disclosure.

For example, as shown in FIG. 6, in conjunction with FIG. 5, transformation module 205 transforms sentence 501 of FIG. 5 (identified by sentence 501' in FIG. 6) by including additional text 601, 602 that provides background knowledge on the topic of sentence 501 deemed to contain subject matter difficult to understand by the user. As discussed above, the topic of the sentence may be determined using natural language processing by identifying the subject of the sentence. In the example of FIGS. 5 and 6, the topic of sentence 501 corresponds to the subject of sentence 501, which is NCCN. As a result, additional information pertaining to the topic (e.g., NCCN) may be gathered by transformation module 205 performing a search online for material related to the topic, such as via network 105, where such material is provided by server 106 connected to network 105.

Such material (e.g., text 601, 602) may then be appended to the document near the sentence (e.g., sentence 501') containing text that may not be understandable to the user without the additional text providing background knowledge to the subject matter of the sentence (e.g., sentence 501').

Furthermore, in one embodiment, words that may be deemed to be difficult to understand, such as "oncology" in sentence 501, may be replaced with more descriptive, easy-to-understand terminology, such as "cancer-related medical care" 603, in sentence 501'. Such difficult words (e.g., oncology) may correspond to a topic of the sentence deemed difficult to understand by the user, where the topic consisting of one or more words may be replaced by transformation module 205 to enhance understandability, such as with words used to describe the topic that were obtained from performing a search online for material related to the topic.

Referring now to FIG. 7, FIG. 7 illustrates another example of transforming the document by including additional text (e.g., additional paragraphs) to provide further background knowledge on the subject matter deemed difficult to understand by the user in accordance with an embodiment of the present disclosure.

As shown in FIG. 7, in conjunction with FIG. 5, transformation module 205 transforms sentence 502 of FIG. 5 (identified by sentence 502' in FIG. 7) by including additional text 701, 702 that provides background knowledge on the topic of sentence 502 deemed to contain subject matter difficult to understand by the user. As discussed above, the topic of the sentence may be determined using natural language processing by identifying the subject of the sentence. In the example of FIGS. 5 and 7, the topic of sentence 502 corresponds to the concept of chemotherapy, which was identified by transformation module 205 in the previous sentence by matching such a term in a data structure (e.g., table) containing a list of topics. Since sentence 502 includes the phrase "following factors," transformation module 205 determined that the topic of the previous sentence still applied to sentence 502.

After identifying the topic of sentence 502, additional information pertaining to the topic (e.g., chemotherapy) may be gathered by transformation module 205 performing a search online for material related to the topic, such as via network 105, where such material is provided by server 106 connected to network 105.

Such material (e.g., text 701, 702) may then be appended to the document near the sentence (e.g., sentence 502') containing text that may not be understandable to the user without the additional text providing background knowledge to the subject matter of the sentence (e.g., sentence 502').

Furthermore, in one embodiment, words that may be deemed to be difficult to understand, such as "comorbidities" in sentence 502, may be replaced with a more descriptive, easy-to-understand terminology, such as "sickness that happens along with other sicknesses" 703, in sentence 502'. In another example, "toxicities" in sentence 502, may be replaced with a more descriptive, easy-to-understand terminology, such as "poisonous qualities" 704, in sentence 502'. In a further example, "kidney" in sentence 502, may be replaced with a more descriptive, easy-to-understand terminology, such as "organ that creates urine" 705, in sentence 502'.

Such difficult words (e.g., comorbidities, toxicities, kidney) may correspond to a topic of the sentence deemed difficult to understand by the user, where the topic consisting of one or more words may be replaced by transformation module 205 to enhance understandability, such as with words used to describe the topic that were obtained from performing a search online for material related to the topic.

Additionally, as shown in FIG. 7, such terms, such as histology 706 in sentence 502' may be highlighted or italicized to indicate that a further description of the term is available upon the user selecting such a term, such as via a mouse connected to the user's computing device, which may correspond to document analyzer 101. In one embodiment, such a further description may correspond to the topic of the sentence deemed difficult to understand by the user, where the description corresponds to words (e.g., "the study of the structure of tissues") used to describe the topic that were obtained by transformation module 205 performing a search online for material related to the topic.

As a result of the foregoing, the embodiments of the present disclosure provide a means for improving the readability of the text by identifying sentences in a document that are difficult for the user to understand and then transforming the document by including additional information (e.g., paragraphs of information) to provide further background knowledge on the subject matter deemed difficult to understand by the user so as to improve readability by the user.

Furthermore, the principles of the present disclosure improve the technology or technical field involving software tools for reading comprehension. As discussed above, there are various software tools that attempt to improve a user's reading comprehension ability, such as by replacing words or phrases that are deemed to be difficult to understand with simpler words. However, such tools are based on words or phrases that are commonly deemed to be difficult to the user which may or may not be the case for the user in question. Furthermore, such term replacement may not assist the user in understanding the text, such as in the case where the user does not have background knowledge in the topic discussed in the text. In another example, a software tool forms an outline based on main ideas highlighted by the user in an attempt to improve the user's reading comprehension ability. However, if the user does not fully understand the meaning of the text, it will be difficult for the user to highlight the main ideas. Furthermore, simply providing an outline may not assist the user in understanding the text, such as in the case where the user lacks sufficient knowledge in the topic discussed in the text. In a further example, a software tool enables the user to visually map the details of the text in an attempt to improve the user's reading comprehension ability. However, such a tool does not assist the user in understanding the meaning of such details. For example, if the user does not understand the meaning of such details in the text, then the mere fact of having such details visually mapped will most likely not assist the user in understanding such text. As a result, such software tools are deficient in improving the readability of the text by the user.

Embodiments of the present disclosure improve such technology by receiving a document, such as a document containing technical content. A final word vector for each word in a sentence of the document is computed, such as by averaging a first word vector and a second word vector for that word. In one embodiment, the first word vector for the word is generated in a first part of a sentence using a first word embedding model and the second word vector for the word is generated in a second part of the sentence using a second word embedding model. In one embodiment, the first and second parts of the sentence each contain the word whose final word vector is computed. Furthermore, elements of a user portrait are vectorized. A "user portrait," as used herein, refers to a tagged user model abstracted based on user attributes, user preferences, lifestyle habits, user behavior and the like. Such user portraits may be associated with particular users. In one embodiment, the elements in the user portraits correspond to such user attributes, user preferences, lifestyle habits of the user, user behavior, etc. A distance is computed between a vector for each word in the sentence and a vectorized element in the user's portrait which is summed to form an evaluation result for the element. An evaluation result is also formed for every other element in the user's portrait by performing such a computation step. A "final evaluation result" is then generated corresponding to the evaluation results for every element in the user's portrait. The document is then transformed in response to the final evaluation result indicating a lack of understanding of the sentence by the user. In one embodiment, the document is transformed by adding additional information (e.g., additional paragraphs) in the document to provide further background knowledge on the subject matter deemed difficult to understand by the user so as to improve readability by the user. In one embodiment, the subject matter deemed difficult to understand by the user corresponds to the topic of the sentences that are deemed difficult to understand by the user. In this manner, readability of the text is improved by identifying sentences in a document that are difficult for the user to understand and then transforming the document by including additional information (e.g., paragraphs of information) to provide further background knowledge on the subject matter deemed difficult to understand by the user so as to improve readability by the user. Furthermore, in this manner, there is an improvement in the technical field involving software tools for reading comprehension.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for improving understandability of text by a user, the method comprising:
   receiving a document;
   computing a final word vector for each word in a sentence of said document;
   vectorizing elements of a user portrait, wherein said user portrait comprises a tagged user model abstracted based on user attributes and user preferences, wherein said elements comprise said user attributes and said user preferences;
   computing a distance between a vector for each word in said sentence and a vectorized element in said user's portrait which is summed to form an evaluation result for said element;
   forming an evaluation result for every other element in said user's portrait by performing said computation step;
   generating a final evaluation result corresponding to said evaluation results for every element in said user's portrait; and
   transforming said document in response to said final evaluation result indicating a lack of understanding of said sentence by said user.

2. The method as recited in claim 1, wherein said transformation of said document comprises retrieving and inserting additional information in said sentence pertaining to a topic of said sentence.

3. The method as recited in claim 2, wherein said topic of said sentence is determined using natural language processing.

4. The method as recited in claim 1, wherein said distance comprises a Euclidean distance.

5. The method as recited in claim 1 further comprising:
   splitting said sentence in said document into a first part and a second part, wherein said first part and said second part each contain a first word; and
   generating a first word vector for said first word in said first part using a first word embedding model and generating a second word vector for said first word in said second part using a second word embedding model.

6. The method as recited in claim 5 further comprising:
   computing said final word vector for said first word by averaging said first word vector and said second word vector.

7. The method as recited in claim 1 further comprising:
   normalizing said final evaluation result; and
   transforming said document in response to said normalized final evaluation result not being less than a threshold value.

8. A computer program product for improving understandability of text by a user, the computer program product comprising one or more computer readable storage mediums having program code embodied therewith, the program code comprising programming instructions for:
   receiving a document;
   computing a final word vector for each word in a sentence of said document;
   vectorizing elements of a user portrait, wherein said user portrait comprises a tagged user model abstracted based on user attributes and user preferences, wherein said elements comprise said user attributes and said user preferences;
   computing a distance between a vector for each word in said sentence and a vectorized element in said user's portrait which is summed to form an evaluation result for said element;
   forming an evaluation result for every other element in said user's portrait by performing said computation step;
   generating a final evaluation result corresponding to said evaluation results for every element in said user's portrait; and
   transforming said document in response to said final evaluation result indicating a lack of understanding of said sentence by said user.

9. The computer program product as recited in claim 8, wherein said transformation of said document comprises retrieving and inserting additional information in said sentence pertaining to a topic of said sentence.

10. The computer program product as recited in claim 9, wherein said topic of said sentence is determined using natural language processing.

11. The computer program product as recited in claim 8, wherein said distance comprises a Euclidean distance.

12. The computer program product as recited in claim 8, wherein the program code further comprises the programming instructions for:
- splitting said sentence in said document into a first part and a second part, wherein said first part and said second part each contain a first word; and
- generating a first word vector for said first word in said first part using a first word embedding model and generating a second word vector for said first word in said second part using a second word embedding model.

13. The computer program product as recited in claim 12, wherein the program code further comprises the programming instructions for:
- computing said final word vector for said first word by averaging said first word vector and said second word vector.

14. The computer program product as recited in claim 8, wherein the program code further comprises the programming instructions for:
- normalizing said final evaluation result; and
- transforming said document in response to said normalized final evaluation result not being less than a threshold value.

15. A system, comprising:
- a memory for storing a computer program for improving understandability of text by a user; and
- a processor connected to said memory, wherein said processor is configured to execute program instructions of the computer program comprising:
  - receiving a document;
  - computing a final word vector for each word in a sentence of said document;
  - vectorizing elements of a user portrait, wherein said user portrait comprises a tagged user model abstracted based on user attributes and user preferences, wherein said elements comprise said user attributes and said user preferences;
  - computing a distance between a vector for each word in said sentence and a vectorized element in said user's portrait which is summed to form an evaluation result for said element;
  - forming an evaluation result for every other element in said user's portrait by performing said computation step;
  - generating a final evaluation result corresponding to said evaluation results for every element in said user's portrait; and
  - transforming said document in response to said final evaluation result indicating a lack of understanding of said sentence by said user.

16. The system as recited in claim 15, wherein said transformation of said document comprises retrieving and inserting additional information in said sentence pertaining to a topic of said sentence.

17. The system as recited in claim 16, wherein said topic of said sentence is determined using natural language processing.

18. The system as recited in claim 15, wherein said distance comprises a Euclidean distance.

19. The system as recited in claim 15, wherein the program instructions of the computer program further comprise:
- splitting said sentence in said document into a first part and a second part, wherein said first part and said second part each contain a first word; and
- generating a first word vector for said first word in said first part using a first word embedding model and generating a second word vector for said first word in said second part using a second word embedding model.

20. The system as recited in claim 19, wherein the program instructions of the computer program further comprise:
- computing said final word vector for said first word by averaging said first word vector and said second word vector.

* * * * *